Figure 1:
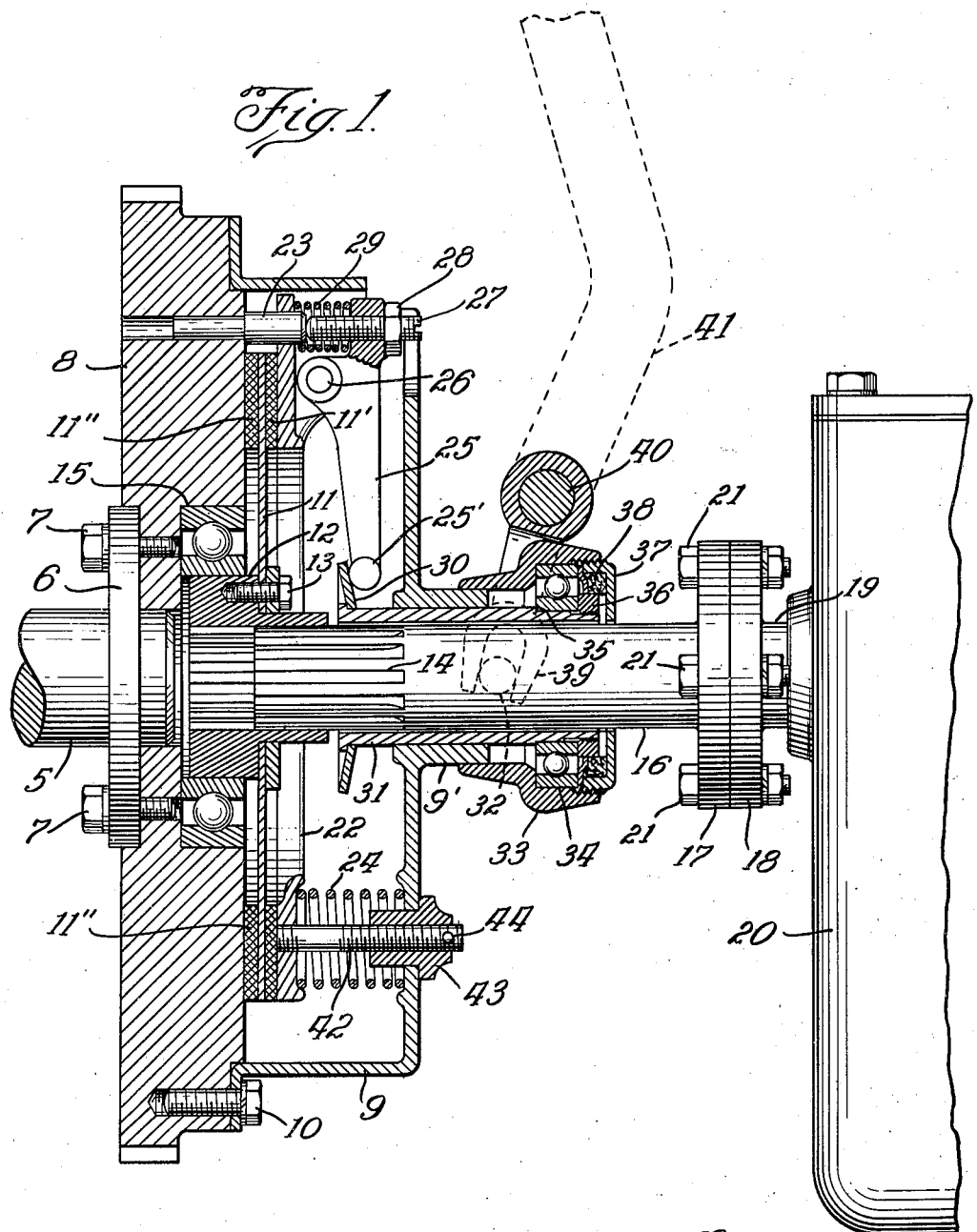

Oct. 21, 1941.  J. O. HOLLOWAY  2,259,933
CLUTCH COUPLING FOR MOTOR VEHICLES
Filed Feb. 20, 1939  2 Sheets-Sheet 1

Inventor:
John O. Holloway.
By:- Tefft & Tefft
Att'ys.

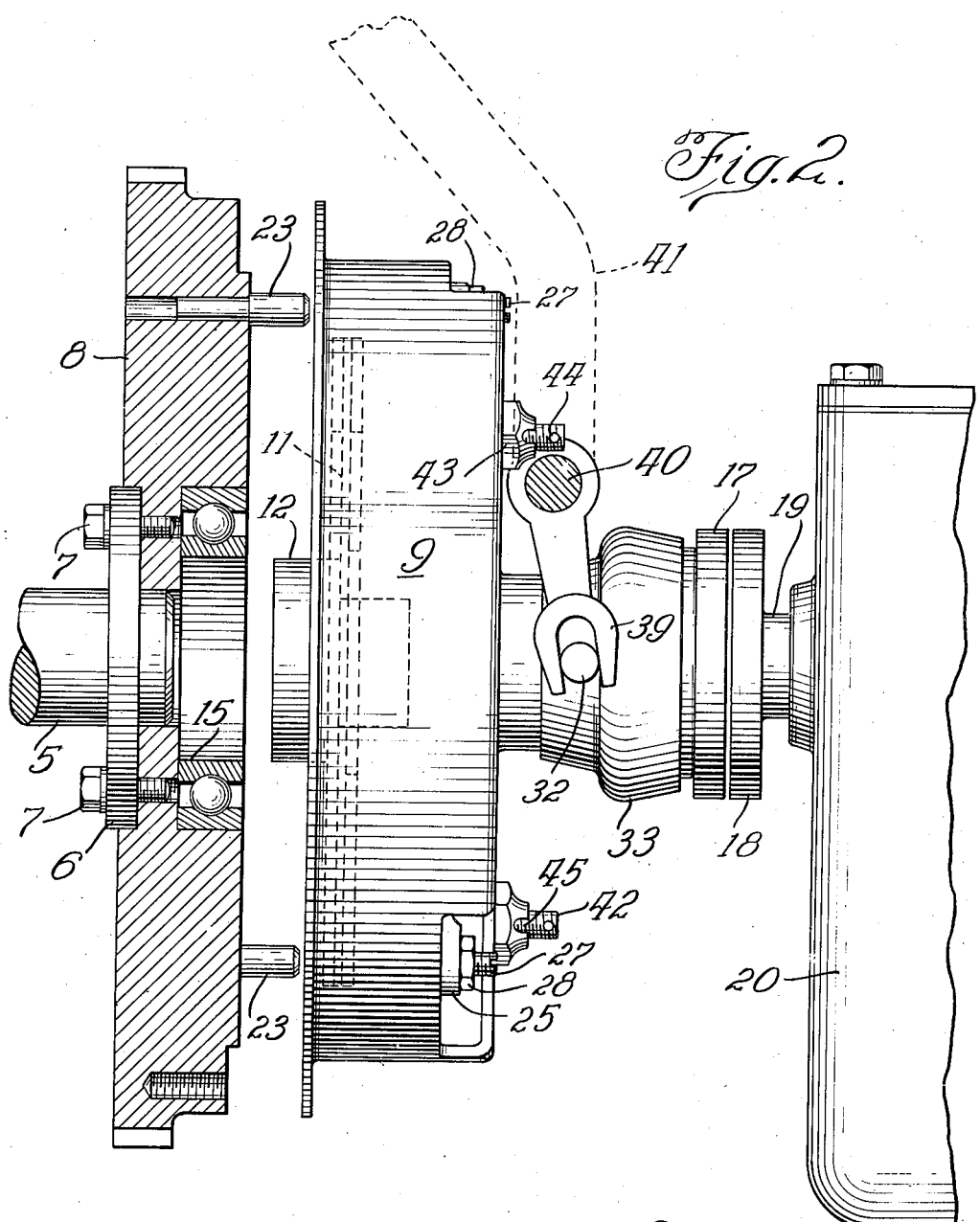

Patented Oct. 21, 1941

2,259,933

UNITED STATES PATENT OFFICE 2,259,933

CLUTCH COUPLING FOR MOTOR VEHICLES

John O. Holloway, Mahomet, Ill.

Application February 20, 1939, Serial No. 257,401

2 Claims. (Cl. 192—110)

This invention relates to an improved clutch coupling which is interposed between the motor and transmission of motor vehicles and is directed to a novel means for permitting easy removal of the clutch for replacement and repairs.

The conventional method of mounting clutches requires expensive dismounting of transmission members to remove the clutch. This operation is slow and expensive and as a result owners of motor vehicles neglect to make needed adjustments, replacements, and repairs, which often leads to serious breakdown.

In commercial vehicles operating under long-hour heavy service, clutch failures often cause breakdowns and delays which seriously affect truck income and often result in damage to valuable cargoes.

It is the particular object of this invention to provide a novel clutch coupling structure which is compact in form but which may be easily telescoped to a more compact form to permit quick and easy removal for replacement and repairs.

Other objects and benefits will be disclosed in the following descriptions and drawings of what is a preferred embodiment of the invention:

Fig. 1 is a cross-sectional elevation view of the clutch coupling to disclose the interior arrangement of the parts when the clutch and coupling are in normal service position; and Fig. 2 is an elevation view of the clutch and coupling telescoped into compact form ready for removal.

Now referring to Fig. 1, the drive end of the motor crank shaft 5 has a flange 6 which mounts the fly wheel 8 by means of cap screws 7 through the flange 6. A clutch housing 9 is attached to the outer face of the fly wheel 8 by cap screws 10. A clutch disk 11, having fabric clutch rings 11' and 11'', is mounted on a bearing pilot 12 by means of cap screws 13. The bearing pilot 12 is slidably mounted on splines 14 in the flanged coupling shaft 16 and is further supported in the inner recess of the ball bearing 15 recessed in the outer face of the fly wheel 8. The coupling shaft 16 has a flange 17 which is normally bolted to a mating flange 18 on the drive shaft 19 of a conventional gear case 20. The flanges 17 and 18 are rigidly held together by through bolts 21, as shown.

A conventional pressure ring 22 slidably supported on locating pins 23 is urged into pressure engagement with the clutch disk 11 by compression springs 24 in the conventional manner. The pressure ring is controlled by clutch levers 25 pivotally mounted on pins 26 on the clutch ring and having an adjustment screw 27 bearing against the locating pins 23 being outwardly urged by springs 29, the adjustment screw 27 being locked in position by lock nuts 28, as shown. The inner end of the clutch levers 25' bear against a hardened steel flange 30 fixed to the sliding sleeve 31 extending through the boss 9' of the clutch housing 9. Yoke pins 32 extend outward from the thrust bearing mounting member 33 which holds a ball thrust bearing 34 between a shoulder 35 and the screw retaining ring 36. The ball thrust bearing 34 is sealed by the shield 37 carrying a packing ring 38. A control yoke 39, extending over the yoke pins 32, controls the sliding sleeve 31 by a pivotal movement of the clutch lever 41 on its pivot 40.

From the above description it is believed that the operation of the clutch will be well understood as most of the details and method of operation are conventional. As a matter of fact, the kind of clutch employed is not pertinent to the invention and the above description of a conventional clutch is merely given to explain and reveal the novel features of the invention. It will, therefore, be understood that any desirable form of clutch may be used and the invention is not limited to any particular design of clutch.

The pressure plate 22 carries a series of studs 42 centrally of the pressure springs 24. These studs extend through the clutch housing 9 and on their ends have castellated sleeve nuts 43 which are normally held out of contact with the outer face of the clutch housing 9 by cotter pins through holes 44 and the castellated openings 45 in the sleeve nuts 43. The purpose of this construction will now be explained.

When it is desired to remove the clutch, the operator removes the flange bolts 21 from the flanges 17 and 18 and the cap screws 10 holding on the clutch housing 9. He then removes the cotter pins from the holes 44 and the castellated openings 45 and screws down the sleeve nuts 43, drawing the pressure plate 22 inward into the clutch housing. He then slides the entire clutch mechanism to the right against the flange 17 by means of the clutch lever 41, as clearly shown in Fig. 2. This permits him to slide the disk pivot 12 inward until it clears the outer face of the fly wheel 8, as shown in Fig. 2. It will now be readily appreciated that the clutch and coupling complete may be slid downward, the yoke pins 32 sliding out of the yokes 39 permitting quick and easy removal. Thus by removing four flange bolts, four clutch housing cap screws and adjusting the three sleeve nuts, the above operations requiring only the usual tools carried in the operator's tool kit, the entire clutch and coupling is removable and the clutch disk 11 instantly removable for any adjustments or repairs required. By means of this novel arrangement, clutch repairs may be made in a fraction of the usual time by the use of ordinary tool kit tools and clutch replacements and repairs can be made by the ordinary operator with a minimum of difficulty and delay.

It will further be appreciated that this entire structure is compacted into a very short space which does not require extensive revision of the conventional motor vehicle construction, and as a matter of fact, clutch couplings of this design may be made to replace the more cumbersome and awkward conventional constructions.

Having thus described the invention, I claim:

1. In a clutch coupling for motor vehicle transmissions, a transmission shaft, clutch means mounted on said shaft, means to releasably attach shaft to gear case in-put shaft on one end, a slidable bearing pilot on the opposite end of the shaft, said bearing pilot being retained in position by clutch spring pressure, means to restrain spring pressure in said clutch, and means to telescope the clutch and bearing pilot along the coupling shaft, to permit the shaft and clutch to be completely removed as a unit for replacement and repairs without disturbing any other mechanism.

2. In a clutch coupling for motor vehicles, a flanged coupling shaft bolted to and rigidly supported by an input transmission shaft on one end, a bearing pilot carrying clutch disks splined to the opposite end of said shaft, slidable outwards for support by the motor and inward to clear the motor, clutch mechanism mounted on said shaft, including spring means to urge the clutch disks into pressure engagement and to hold the bearing pilot outward in motor supporting relationship, and means to relieve said spring pressure to permit the pilot bearing to be slid inward to clear the motor and to permit the clutch coupling to be completely removed as a unit without disturbing either the motor or the transmission.

JOHN O. HOLLOWAY.